(12) United States Patent
Koch

(10) Patent No.: US 12,011,750 B2
(45) Date of Patent: Jun. 18, 2024

(54) METHOD FOR PRODUCING A CARCASS, A METHOD OF PRODUCING A FLEXIBLE PIPE AND A FLEXIBLE PIPE

(71) Applicant: National Oilwell Varco Denmark I/S, Brøndby (DK)

(72) Inventor: Lasse Tang Koch, Brøndby (DK)

(73) Assignee: National Oilwell Varco Denmark I/S, Brøndby (DK)

( * ) Notice: Subject to any disclaimer, the term of this patent is extended or adjusted under 35 U.S.C. 154(b) by 84 days.

(21) Appl. No.: 17/768,085

(22) PCT Filed: Oct. 14, 2020

(86) PCT No.: PCT/EP2020/078847
§ 371 (c)(1),
(2) Date: Apr. 11, 2022

(87) PCT Pub. No.: WO2021/074192
PCT Pub. Date: Apr. 22, 2021

(65) Prior Publication Data
US 2023/0271241 A1 Aug. 31, 2023

(30) Foreign Application Priority Data

Oct. 15, 2019 (DK) .................................. 2019 01217

(51) Int. Cl.
*B21C 37/12* (2006.01)
*F16L 11/16* (2006.01)

(52) U.S. Cl.
CPC .......... *B21C 37/121* (2013.01); *B21C 37/123* (2013.01); *F16L 11/16* (2013.01)

(58) Field of Classification Search
CPC ....... B21C 37/121; B21C 37/12; B21C 37/06; B21C 37/123; F16L 11/16; F16L 11/14; F16L 11/00
See application file for complete search history.

(56) References Cited

U.S. PATENT DOCUMENTS 4,493,140 A * 1/1985 Abdullaev .............. F16L 11/16
29/446
6,543,488 B2 4/2003 Foti et al.
(Continued)

FOREIGN PATENT DOCUMENTS

EP 3502535 A1 6/2019
FR 2930622 A1 10/2009
(Continued)

OTHER PUBLICATIONS

International Search Report and Written Opinion for PCT/EP2020/078847 dated Feb. 1, 2021.
(Continued)

*Primary Examiner* — Lawrence Averick
(74) *Attorney, Agent, or Firm* — Pearne & Gordon LLP

(57) ABSTRACT

A method of producing a carcass for a flexible pipe, the carcass and a flexible pipe with the carcass includes providing at least one first metallic strip a cover metallic strip. Shaping the first strip to have a profile with a first fold adapted to face towards the carcass axis and a second fold adapted to face away from the carcass axis. Pretreating an anchor width section of the cover strip including a weakening treatment of resistance against length extension and/or a length extension of the pretreated part of the anchor width section. Inserting the anchor width section of the cover strip into the first fold, ensuring that a cover width section of the cover strip extends beyond the second fold. Helically winding the first metallic strip and the cover strip, to provide that the first fold engages and interlocks with the second fold and that the cover width section covers a helical interstice between windings of the first metallic strip on the inner side of the carcass.

21 Claims, 8 Drawing Sheets

(56) References Cited

U.S. PATENT DOCUMENTS

| | | | |
|---|---|---|---|
| 7,971,610 B2* | 7/2011 | Booth | F16L 9/045 138/131 |
| 9,506,585 B2* | 11/2016 | Clements | F16L 11/16 |
| 10,001,228 B2* | 6/2018 | Gundstrup | C22C 38/14 |
| 2008/0190508 A1* | 8/2008 | Booth | F16L 11/16 138/143 |
| 2014/0116565 A1* | 5/2014 | Gundstrup | F16L 11/16 138/139 |
| 2014/0311613 A1* | 10/2014 | Clements | F16L 11/24 138/137 |
| 2015/0252920 A1 | 9/2015 | Farnes et al. | |
| 2016/0003381 A1* | 1/2016 | Király | B21C 37/124 138/134 |
| 2020/0398325 A1 | 12/2020 | Stikan et al. | |

FOREIGN PATENT DOCUMENTS

| | | |
|---|---|---|
| FR | 3017439 A1 | 8/2015 |
| WO | 2013088138 A1 | 6/2013 |
| WO | 2014000816 A1 | 1/2014 |
| WO | 2014135906 A1 | 9/2014 |
| WO | 2015121424 A1 | 8/2015 |

OTHER PUBLICATIONS

"Recommended Practice for Flexible Pipe", ANSI/API Recommended Practice 17B, fifth Edition, May 2014.
"Specification for Unbonded Flexible Pipe", ANSI/API Specification 17J, Fourth edition, May 2014.

* cited by examiner

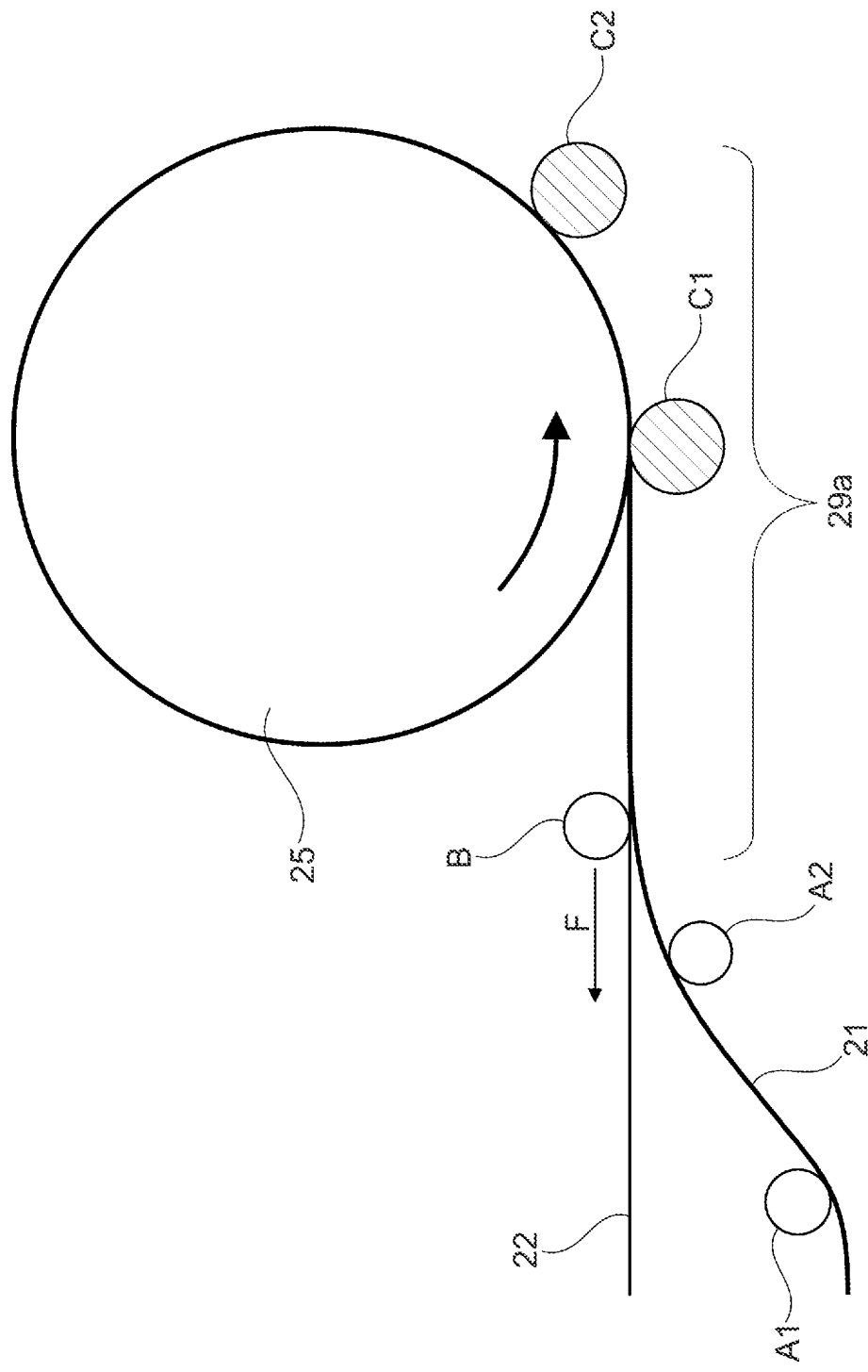

METHOD FOR PRODUCING A CARCASS, A METHOD OF PRODUCING A FLEXIBLE PIPE AND A FLEXIBLE PIPE

TECHNICAL FIELD

The invention relates to a method for producing a carcass for a flexible pipe as well as a method of producing a flexible pipe and a flexible pipe comprising an internal pressure sheath, at least one outer armor layer and a carcass comprising a cover strip.

BACKGROUND

Flexible offshore pipes are widely used for transport of hydrocarbons such as oil and gas. Basically, a flexible pipe comprises an internal pressure sheath or inner liner with a hollow bore through which the hydrocarbons are transported. The internal pressure sheath is in most cases produced from polymer material, which is extruded to form a tubular internal pressure sheath, which has a high degree of impermeability in respect of the hydrocarbons to be transported. The internal pressure sheath may be supported and reinforced by several other layers, such as pressure armors and tensile armors. These layers are normally applied on the outer surface of internal pressure sheath. However, due to external pressure it may sometimes be necessary to support internal pressure sheath on the inner surface against collapse due to a pressure drop in the pipe bore. Normally, such a support is a metal structure known as a carcass. A carcass is conventionally made from elongate strips of metal, which are wound to form a tubular structure. The strips of metal may be wound with overlaps between consecutive windings to form the tube. Moreover, in their edge parts the metal strips may be provided with bends which may engage in consecutive windings and "lock" the windings to each other, thereby providing longitudinal strength to the resulting tube.

Consequently, flexible offshore pipes, hereafter referred to as flexible pipes, are for example used in the oil industry for raising or transporting hydrocarbons from a subsea well head to a platform or floating equipment such as a Floating Production and Storage Offloading unit known by the abbreviation FPSO. Such steel armored flexible pipes for offshore applications are generally known from the standard "Recommended Practice for Flexible Pipe", ANSI/API 17B, fifth Edition, May 2014 (hereafter API17B), and the standard "Specification for Unbonded Flexible Pipe", ANSI/API 17J, Fourth edition, May 2014 (hereafter API17J), published by the American Petroleum Institute.

Several types of carcasses have been applied to support the internal pressure sheath in a flexible pipe structure. The carcasses may be manufactured from elongate metal strips, which may be folded into several different cross sections. The folded cross sections improve the strength in the resulting carcass.

However, these traditional carcass types will have a small gap, groove or interstice between adjacent windings and when gas is flowing through the flexible pipe, pulsations can be generated by lock-in of synchronized vortex shedding in the groves of the carcass. This phenomenon has been observed on floating production platforms connected to flexible risers conveying gas, e.g. for export or for injection into the hydrocarbon reservoir. Thus, when the gas flow reaches a certain velocity, the gaps between the adjacent windings may cause formation of local vortexes in the flow and the formation of these vortexes may again cause high levels of distinctive tonal noise and vibrations in the flexible pipe. This phenomenon is known as "singing carcasses", "singing risers" or flow-induced pulsations (FIP) and is highly undesirable as the vibrations may result in fatigue damage. In particular, the vibrations may spread to the connected structure comprising parts such as topside piping and subsea manifolds and cause severe fatigue damage on those parts.

Consequently, attempts have been made to reduce or eliminate the formation of the vortexes. One very simple way to eliminate the formation of vortexes in the flow is to reduce the velocity of the flow of gases in the flexible pipe. However, this solution will also reduce the capacity of the flexible pipe. Thus, alternative attempts have been made to avoid vortex formation at high flow velocities of gas.

French patent application FR2930622 A1 discloses a method for eliminating vibrations by providing the strips from which the carcass is made with holes in the surface.

International patent application WO 2014/000816 A1 suggests a solution in which the gaps are provided with an insert profile, which at least partly closes the gaps between adjacent windings.

International patent application WO 2014/135906 A1 discloses a flexible metal pipe made from a layered strip. One of the layers in the strip may be un-folded and cover crevices in the flexible metal pipe. The structure makes it very difficult to achieve a pipe having a uniform diameter. To achieve a uniform diameter the layered strip needs to be modified by twisting or further bending which complicates the manufacture of the metal pipe.

U.S. Pat. No. 6,543,488 B2 and international patent application WO 2015/121424 A1 both discloses an insert piece, which can be inserted in the carcass structure and cover the gaps between consecutive windings.

In practice it has appeared that during manufacturing of a carcass with an integrated cover strip major differences in the forces affecting different parts of the S-shaped cover strip may lead to undesired deformation and undulations of the cover strip, such as buckling and therefore such cover strips have never been used with any success in practice.

DISCLOSURE OF THE INVENTION

An object of the present invention is to provide a method for producing a carcass with an improved carcass structure comprising a cover strip.

In an embodiment, it is an object of the present invention is to provide a method for producing a carcass comprising a cover strip and in which the risk of buckling and resulting formations of undulations of the cover strip during manufacturing of the carcass is significantly reduced.

In an embodiment an object is to provide flexible pipe comprising a carcass with a cover strip for a flexible pipe, which reduces the risk of vortex formation in the transported fluid and preferably at the same time reduces the risk of corrosion of the carcass material.

These and other objects have been solved by the invention as defined in the claims and as described herein below.

It has been found that the invention and embodiments thereof have a number of additional advantages, which will be clear to the skilled person from the following description.

The invention is defined in the claims.

In a first aspect the present invention relates to a method for producing a carcass suitable for a flexible pipe for conveying a fluid, specifically suitable for conveying fluids comprising gas.

The carcass produced according to the method is especially advantageous for use in a subsea flexible pipe and in particular where the subsea pipe is for transporting gas containing fluid.

The method comprises providing at least one first metallic strip and a cover strip both have a length and a width. Preferably the at least one first metal strip is one single first metal strip, but in an alternative embodiment several first strips are interconnected to form a first metallic strip assembly, e.g. by being interconnected along edges.

The terms "first metallic strip" and "first strip" are used interchangeable and also include a strip assembly as mentioned above.

The terms "cover metallic strip" and "cover strip" are used interchangeable

According to the method, the first strip (or strip assembly if there are more than one first strip) is shaped to have a profile with a first fold adapted to face towards the carcass axis and a second fold adapted to face away from the carcass axis. The cover metallic strip has an anchor width section and a cover width section and the method comprises inserting the anchor width section of the cover strip into the first fold of the first strip and providing that the cover width section of the cover strip extends beyond the second fold and helically winding the first metallic strip and the cover strip, to provide that the first fold engages and interlocks with the second fold and that the cover width section covers a helical interstice between windings of the first metallic strip on the inner side of the carcass i.e. the side facing inwards.

According to the method at least a part of the anchor width section of the cover strip is subjected to a pretreatment before insertion into the first fold, wherein the pretreatment comprising a weakening resistance treatment against length extension and/or a length extension of the pretreated part of the anchor width section. The pretreatment is also referred to as the pretreatment of the cover metallic strip to obtain a reduction of resistance against length extension. As explained this pretreatment advantageously also ensures a reduction in resistance to bending The method according to the invention provides a carcass for a flexible pipe, which have superior qualities and reduces the risk of vortex formation in the fluid transported in a pipe comprising the carcass.

Without being bound by the theory, it is believed that the problem of applying a cover strip in the prior art methods is that the cover width section of the cover strip is a "free width section" where the edge along the cover width section not fixed and in practice the cover strip is only fixed by being anchored by the anchor width section. Further the cover width section has a winding radius which is less than the winding radius of the anchor width section. This difference in winding radius results in excessive tensioning in the cover strip during the helically winding, in particularly in the part of the cover width section closest to the anchor width section and this tensioning results in buckling with resulting tensioning undulations of the cover width section.

By subjecting at least a part of the anchor width section to the pretreatment before insertion into the first fold and thereby before helically winding, the tensioning in the cover strip during the helically winding has been at least partly reduced and thereby the buckling with resulting tensioning undulations of the cover width section is also reduced or fully avoided.

The pretreatment ensures that at least a portion of the anchor width section can be extended in length without extending the cover width section and with a reduced formation of tensioning in the cover width section. The weakening treatment of resistance against length extension ensures that resistance in the anchor width section is against extension in length direction of the cover strip is reduced.

Advantageously the cover width section is not subjected to weakening treatment of resistance against length extension.

In an alternative embodiment the pretreatment comprises actually extending at least a part of the anchor width section in length direction of the strip. Thereby, when helically winding the cover strip with the difference in winding radius of the cover width section and the anchor width section, the anchor width section is subjected to less extension forces, which again results in less tensioning, less buckling and less formation of tensioning undulations.

Advantageously the first metallic strip is or shaped into a substantially "S" shaped cross-sectional profile where the two folds in the "S" provides the first and the second folds. Initially the S-shaped profile is not shaped to the final shape, but kept sufficiently open in its first and second folds to allow insertion of the anchor width section of the cover into the first fold and to allow interlocking the first and the second folds.

The profile of the first metallic strip is brought to the final shape during the helically winding of the first metallic strip and the cover metallic strip to form the carcass. During this process, the profile of the first metallic strip will also be interlocked by interlocking the first fold with the second fold of an adjacent winding and thereby form a tube comprising interlocked windings of first strip(s). Between the interlocked windings is formed a helical interstice—sometimes called a gap, which on the inner side of the tube is covered by the cover width section of the cover metallic strip.

The term "inner side" of a layer is the side of the layer facing the axis of the pipe. The term "outer side" of a layer is the side of the layer facing away from the axis of the pipe.

The term "substantially" should herein be taken to mean that ordinary product variances and tolerances are comprised.

Advantageously the pretreatment provides that the bending resistance to bending perpendicular to the cover strip length in the treated of part of the anchor width section is reduced to less than 50%, when compared to the resistance to bending without the pretreatment.

Thereby, the tensioning in the cover width section when helically winding the cover strip may be even further reduced.

In an embodiment of the method at least 20%, such as at least 40%, such as at least 60%, such as at least 80% of the anchor width section is weakened by the pretreatment. This pretreatment advantageously also ensures that resistance to bending is reduced to less than 50% when compared to the resistance to bending of non-treated cover metallic strip width.

Advantageously, the anchor width section comprises at least 40% of the width of the cover metallic strip and this anchor width section is advantageously inserted in the first fold of the first metallic strip to be anchored in the interlocking provided when the first fold engages and interlocks with the second fold of the first strip.

Advantageously the pretreated part of the anchor width section comprises at least 30% of the width of the cover strip, such as at least 40%, such as at least 50% of the width of the total cover strip.

The first fold of the first strip has a depth and a width at the depth, and the pretreated part of the anchor width section advantageously comprises at least a width corresponding to the width at the depth of the first fold.

Thereby a very strong anchoring of the cover strip may be provided to ensure that the cover strip is not escaping out of the interlocking in the first strip when the carcass is subjected to bends or is coiled.

Advantageously the first fold of the first strip has a depth and curved section between respectively a first edge and a second edge along the depth, where the second edge is closer to the second folding than the first, and wherein the pretreated part of the anchor width section comprises at least a width corresponding to the width at the depth of the first fold.

Thereby an even stronger anchoring may be provided.

In practice the anchor width section of the cover metallic strip inserted in the profile of the first metallic strip may comprise treated and untreated sub-width sections, such as at least an edge section thereof. However, advantageously at least 40% of the width of the cover metallic strip, which is inserted in the profile of the first metallic strip is treated such that the resistance to bending is reduced to less than 50% when compared to the bending resistance to bending of a non-treated cover metallic strip width section.

The treatment of at least 40% of the width of the cover metallic strip, which is inserted in the profile of the first metallic strip, i.e. the anchor width section, has surprisingly appeared to have a good effect during the manufacturing of the carcass appears to further counteract the forces which occur during the helically winding of the metallic strips, and therefore may result in an even further reduction of undesired deformations.

The first metallic strip and the cover metallic strips are advantageously assembled by inserting the anchor width section of the cover strip into the first fold of the first metallic strip and thereafter the assembly is helically wound to form the carcass. The assembly is advantageously wound with a winding angle in the range of 80 to 89.8 degrees in respect of the axis of the carcass. The first metallic strip and the cover metallic strip are preferably made from the same metallic alloy, the alloy may e.g. be selected from carbon steel or duplex steel.

The pretreatment comprising the weakening treatment of resistance against length extension may in an embodiment comprise a mechanical, a chemical and/or a thermal treatment.

In an embodiment, wherein the pretreatment comprises a mechanical pretreatment.

In an embodiment, the pretreatment comprises stretching the material to increase in length, preferably by preforming at least a part of the anchor width section to have a shape adapted to conform to the first fold. Thereby at least the part of the anchor width section is extended and during winding the tension generated in the cover width section may be very low and hence the risk of buckling and resulting tension undulations may be highly reduced or even fully avoided In an embodiment, the pretreatment comprises providing weakening lines in the anchor width section. Advantageously, the weakening lines are substantially perpendicular to the length of the cover strip. The weakening lines are advantageously in the form of grooves and/or recesses for example provided by cutting, pressing, embossing, such as pressing using a press tool. In an embodiment, the weakening lines are made to fully penetrate the material of the anchor width section, this may advantageously be provided by cutting, wherein the cutting comprises cutting fully through the strip material.

In an embodiment, the weakening lines are made by cutting out strips of the treated part of the anchor width section.

In an embodiment, at least a part of the weakening lines are not fully penetrating the strip material, bur advantageously the weakening lines are sufficiently deep and/or weak to break fully up upon the helically winding if the strips. This embodiment has the benefit that it is very simple to provide.

The weakening lines advantageously has a length of from 1 to 5 cm, such as from 3 to 4 cm. The distance between weakening lines is advantageously from 1 mm to 1 cm, such as from 2 mm to 5 mm.

Where the weakening lines comprises cutting out strips of the treated part of the anchor width section, the strip shaped holes provided advantageously has a width of up to 5 mm, such as from 1 to 4 mm.

It has been found that the cutting of the weakening lines also reduces the resistance to bending discussed above.

Cutting in metallic strips is well-known technique which can be performed easy and cost-effective.

The cutting can be performed partly or fully made by mechanical means. Mechanical cutting is easy and cheap to perform. The cutting can also be performed partly or fully by cutting using focused electromagnetic radiation or an electron beam. Cutting by electromagnetic radiation or an electron beam, such as a laser beam, can provide very precise and focused cuts and the cutting and the process is easy to control.

In an embodiment, the weakening treatment of resistance against length extension is performed using pressing by a press tool. The pressing tool may be used to weakening at least 40% of the width of the anchor width section. This may in addition reduce the resistance to bending.

The weakening lines may in an embodiment be provided by laser cutting and/or electron beam.

The pretreatment may advantageously comprise providing weakening lines in at least a part of the anchor width section of the cover strip by partly or fully cutting through the strip material e.g. as described above.

The cover strip may advantageously have a first edge forming an edge of the cover width section and a second edge forming an edge of the anchor width section. The first and the second edge of the cover strip are advantageously parallel.

Advantageously, the weakening lines individually from each other are perpendicular or up to 10 degrees from being perpendicular to the anchor width section edge, such as perpendicular or up to 10 degrees from being perpendicular to the anchor width section edge, such as perpendicular ±2 degrees to the anchor width section edge.

The weakening lines advantageously comprises substantially parallel and/or straight lines.

In an embodiment, the weakening treatment of resistance against length extension comprises a thermal treatment. The thermal treatment is advantageously localized thermal treatment.

In an embodiment, the thermal treatment may also reduce the resistance to bending of the treated part of the anchor width section. Advantageously at least the 40% of the width of the cover metallic strip is treated by localized thermal treatment. Advantageously, at least 20% of the width of the anchor width section of the cover metallic strip is treated by localized thermal treatment.

The thermal treatment affects the structure of the metallic material such that the resistance against length extension is reduced and in addition also resistance to bending of the thermal treated metallic strip may be reduced.

It has been found that the pretreatment of the cover metallic strip to obtain a reduction of the resistance against length extension and preferably a reduction in resistance to bending, mainly should be carried out on the width part of the strip, which is subjected to major forces and strain during the winding of the carcass. Since the anchor width section is wound with a larger radius than the cover width section, the anchor width section will be subjected to larger forces and strain than the cover width section.

Advantageously, the part of the anchor width section subjected to the pretreatment comprises a width section which during helically winding of the at least one first metallic strip and the cover strip is subjected to tensile strain e.g. provided partly of fully by application of a stretching force.

The anchor width section, may have a sub-width part wound with larger radius than another sub-with section and preferably at least the sub-width section of the anchor width section wound with the larger radius is subjected to the pretreatment e.g. is provided with weakening lines.

Thus, according to an embodiment of the method the pretreatment of the cover metallic strip to obtain a reduction in resistance against length extension and preferably a reduction in resistance to bending is predominantly carried out in sections of the cover metallic strip, which are subjected to tensile strain during final forming of the cover metallic strip in the carcass. Preferably the pretreatment of the cover metallic strip to obtain a reduction in resistance against length extension is predominantly carried out in a width section of the cover metallic strip, which is subjected to tensile strain in the width direction of the cover strip during preshaping, helically winding and/or final forming of the cover metallic strip. Thus, the pretreatment of the cover metallic strip to obtain a reduction in resistance against length extension is predominantly carried out in at least a portion of the width of the anchor width section.

In an embodiment, the pretreatment of the cover metallic strip to obtain a reduction in resistance against length extension and preferably a reduction in resistance to bending, is predominantly carried out in sections of the cover metallic strip which are subjected to compressive strain during final forming of the cover metallic strip in the carcass.

The major load bearing part of the carcass is the profile of the first metallic strip. Therefore the load bearing capacity of the cover metallic strip may be significantly lower than the load bearing capacity of the first metallic strip. Thus, the cover metallic strip does not need to be as thick as the first metallic strip, and in an embodiment the first metallic strip is thicker than the cover metallic strip, such as at least 2 times thicker, such as at least at least 5 times thicker, such as at least 10 times thicker.

The first metallic strip may for example have a thickness of 2 mm and the cover metallic strip may have a thickness of 1 mm. In an embodiment, the first metallic strip may have a thickness of 3 mm and the cover metallic strip may have a thickness of 0.5 mm. Typically, the thickness of the first metallic strip is in the range of 2 to 5 mm and the thickness of the cover metallic strip may be in the range of 0.5 to 2 mm.

In an embodiment, the thickness of the cover metallic strip varies over its width, e.g. such that the anchor width section is up to 50% thinner than the cover width section.

The difference in the thickness of the metallic strips provides material savings and also facilitates the manufacture of the carcass. The difference in the thickness of the metallic strips also makes it easier to obtain an even and smooth surface on the inner side of the carcass.

In an embodiment the anchor width section of the cover metallic strip inserted in the first fold of the first metallic strip is conforming with the profile of the first metallic strip when the profile is closed to its final shape. The embodiment provides a carcass profile with optimized strength-to-weight ratio and also with reduced risk of corrosion.

In an embodiment, the method comprises providing that the major part of the of the anchor width section the first is conforming with the fold, preferably the major part of the of the anchor width section the first is conforming with an inner surface of the fold and hold in fixed position by the second fold in a consecutive winding.

In an embodiment, the first metallic strip has a first edge forming part of the first fold and a second edge forming part of the second fold. The first and the second ends of the first metallic strip are advantageously parallel preferably to provide that the first metallic strip in lengthwise extension is uniform.

In an embodiment, the method comprises forming the first metallic strip to have a lip adjacent to the first edge. Such lip ensures a safe engagement between the first fold and the second fold. Advantageously, the anchor width section of the cover strip located in the first fold extends beyond the lip, to be located between the lip and the second fold which is interlocked with the first fold. This ensures a safe anchoring of the anchor width section of the cover strip, to thereby reduce the risk of local lengthwise portions of the cover strip escapes from the first fold e.g. when the carcass is subjected to bends, such as during coiling onto a reel or when the pipe comprising the carcasse is subjected to excessive forces and/or local bends In an embodiment, the anchor width section of the cove strip located in the first fold extends to the first edge the first metallic strip. Thereby the anchor width section is very safely anchored in the first fold of the first strip.

The method may advantageously comprise applying a pulling force F to the cover strip during the insertion of the anchor width section of the cover strip into the first fold and/or during the helically winding of the first metallic strip and the cover strip.

The pulling forde applies a tensile strain to the cover strip which may advantageously stretch at least a width portion of the anchor width section, preferably the pretreated portion of the anchor width section.

The pulling force applied to the cover strip is advantageously sufficient to stretching at least the portion of the anchor width section.

In an embodiment, the method comprises subjecting at least a portion of the anchor width section to tensile strain during the insertion of the anchor width section of the cover strip into the first fold and/or during the helically winding of the first metallic strip and the cover strip, wherein the tensile force preferably is at least partly provided by providing a pulling force in the cover strip.

The pulling force may e.g. be applied to the cover strip by a restraining arrangement in a cover strip supply station adapted for pre-shaping and/or pretreating the cover strip.

Advantageously, the tensile strain is sufficient to provide a deformation of a plurality of the weakening lines—such as all of the weakening lines. The deformation of each of the plurality of weakening lines may advantageously comprise providing that a pair of a first and a second opposite edges of a weakening line separates and/or increases distance to each other. In an embodiment, where the respective weakening lines is provided by through holes form out cut strips of material, the deformation of each of the plurality of weakening lines may advantageously comprise providing that the pair of a first and a second opposite edges of the weakening line separates further from each other to provide that the through hole becomes larger. In an embodiment, where the respective weakening lines does not comprise a through hole, the deformation of each of the plurality of weakening lines may advantageously comprise providing that the pair of a first and a second opposite edges of the weakening line separates from each other to provide a through hole in the anchor width section strip material.

The invention also relates to a method for producing a flexible pipe for conveying a fluid. The method comprises
providing a carcass according to any one of the preceding claims;
extruding a polymer layer onto the carcass;
applying one or more armor layers around the polymer layer;
optionally applying one or more polymer layers;

The extruded polymer layer advantageously forms an internal pressure sheath. On the outer side of the extruded polymer layer one or more layers such as armor layers are applied.

In an embodiment the method comprises the step of applying a pressure armor. One or more pressure armor layers may be applied, preferable constituted by wound metallic strips, and preferably wound around the pipe with a winding angle between 65° to 89° in respect of the axis of the pipe. The pressure armor supports the pipe in respect of radial forces exposed to the pipe.

In an embodiment the method comprises the step of applying one or more tensile armors. One or more tensile armoring layers, preferable constituted by wound metallic strips, and preferably wound around the pipe with a winding angle between +/−25° to +/−55° in respect of the longitudinal axis. If two tensile armor layers are applied, the layers are preferably cross-wound. The tensile armor protects the pipe against axial forces.

The term "cross-wound layers" means that the layers comprise wound elongate elements that are wound in opposite direction relatively to the longitudinal axis of the pipe where the angle to the longitudinal axis can be equal or different from each other.

Advantageously the pipe is of the unbonded flexible type.

The unbonded flexible pipe manufactured according to the method of the invention may comprise both pressure armor and tensile armor. If this is the case the one or more pressure armor layers are wound around the internal pressure structure and the one or more tensile armor layers are wound around the pressure armor. In an embodiment the unbonded flexible pipe comprises at least one pressure armor layer and two tensile armor layers. Preferably the two tensile armor layers are cross-wound.

Although the external armor layers may be made from any suitable material such as steel, stainless steel and fibre reinforced polymer, in an embodiment the one or more external armor layers are made from carbon steel. Preferably the external armor layers are located in an annulus of the pipe and protected by the internal pressure sheath and an outer sheath.

Consequently, in an embodiment the method comprises the step of applying an outer polymer layer to form an outer sheath. The outer sheath and the internal pressure sheath form together an annulus in which the armor layers, such as pressure armor and tensile armor can be located and protected from ingress of water.

When the carcass has been formed the polymer layer is extruded onto the outer side of the carcass. The polymer layer forms a substantially fluid tight barrier around the carcass and is normally referred to as the internal pressure sheath.

On the outer side of the internal pressure sheath one or more armor layers may be applied, such as a pressure armor layer and one or more tensile armor layer.

Optionally, the pipe is applied with one or more polymer layers, which may be applied as extruded layers or as wound tape. The polymer layers may e.g. function as intermediate layers, insulating layers, anti-wear layers or anti-creep layers.

The flexible pipe may also comprise an extruded polymer layer constituting an outer sheath, which may serve to prevent ingress of water to the internal pipe parts.

Examples of polymer material which may be applied alone or in combination with other materials suitable for manufacture of the one or more polymer layers comprise the materials selected from polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as glass-fibers, carbon-fibers and/or aramide fibers.

The invention also comprises a flexible pipe for conveying a fluid. The pipe may comprise the layers and elements as discussed above and may preferably be an unbonded flexible pipe for use as a rises pipe.

The pipe comprising a center axis along the length of the pipe and from the inside and out; a carcass, an internal pressure sheath and at least one armor layer.

The carcass comprises at least one first metallic strip and a cover strip. The first metallic strip comprises a first fold facing towards the center axis and a second fold facing away from the center axis. The cover strip comprises an anchor width section and a cover width section, and wherein the first and the second fold of the first strip being interlocked with the anchor width section anchored in the interlocking and preferably the cover width section has a winding radius which is less than the winding radius of the anchor width, while the cover width section is substantially free of tension undulations.

Thereby the risk of the phenomenon known as "singing carcasses", "singing risers" or flow-induced pulsations (FIP) may be reduced or fully avoided.

Advantageously, the cover width section of the cover strip provides a substantially smooth bore in the pipe.

Advantageously the carcass and preferably the flexible pipe is obtainable by the method described above and claimed herein, wherein the anchor width section comprises weakening lines in at least a part, preferably a width portion thereof, of said anchor width section of said cover strip.

In an embodiment, the weakening lines comprises cuts into the cover strip material.

In an embodiment, each of a plurality of the weakening lines comprises a pair of a first and a second opposite edges which are at least partly separated from each other to provide a through going opening in the strip material.

In an embodiment, the first metallic strip has a first edge forming part of the first fold and a second edge forming part of the second fold, wherein the metallic strip is shaped to have a lip adjacent to the first edge, wherein the anchor width section of the cover strip located in the first fold extends beyond the lip, to provide that a portion of the anchor width section is located between the lip and the second fold which is interlocked with the first fold.

In an embodiment, the first metallic strip has a first edge forming part of the first fold and a second edge forming part of the second edge, wherein the anchor width section of the cove strip located in the first fold extends to the first edge the first metallic strip.

The pretreatment of the cover metallic strip to obtain a resistance against length extension reduction and preferably a reduction in resistance to bending results in that the cover width section is substantially free of tension undulations. Heretofore, it has in practice not been possibly to produce a carcass with a cover strip, without many tension undulations at the cover width section.

Thus, the present invention also provides a flexible pipe which may advantageously be manufactured according to method disclosed above and where the cover metallic strip forms a covering the helical interstice (gap) formed between adjacent windings of the profile of the first metallic strip.

The flexible pipe is advantageously of the unbonded type e.g. ad described in API17B and/or API17J. The flexible pipe may advantageously be a subsea pipe. The flexible pipe is advantageously for use in transportation of gas containing fluid, such as for use in the offshore production of oil and gas.

In an embodiment of the flexible pipe, the cover metallic strip is bent such that the cover metallic strip in axial direction of the pipe exhibits varying radius in respect of the axis of the pipe. The varying radius allows the cover metallic strip to be inserted in and conforming to the profile of the first metallic strip.

The varying radius also provides varying tensions in the cover metallic strip, which improve the properties in respect of covering the helical interstice formed between adjacent windings of the profile of the first metallic strip. Thus, the invention provides an embodiment of the flexible pipe where the cover metallic strip provides a substantially smooth bore in the pipe.

In an embodiment of the flexible pipe, the fluid transported in the pipe is gas. Although the flexible pipe according to the invention is suitable for transporting any fluid, such as liquid or gas, the flexible pipe is particular suitable for transporting gases. Gases have a higher tendency of vortex formation creating flow-induced pulsation during transport and the flexible pipe according to the invention provides a high reduction in the risk of vortex formation.

All features of the inventions including ranges and preferred ranges can be combined in various ways within the scope of the invention, unless there are specific reasons not to combine such features.

BRIEF DESCRIPTION OF PREFERRED EMBODIMENTS AND PARTS THEREOF

The above and/or additional objects, features and advantages of the present invention will be further elucidated by the following illustrative and non-limiting description of embodiments of the present invention, with reference to the appended drawings.

The figures are schematic and are not drawn to scale and may be simplified for clarity. Throughout, the same reference numerals are used for identical or corresponding parts.

FIG. 4a is a schematic illustration of a variation of the method illustrated in FIG. 4.

Figure 1:
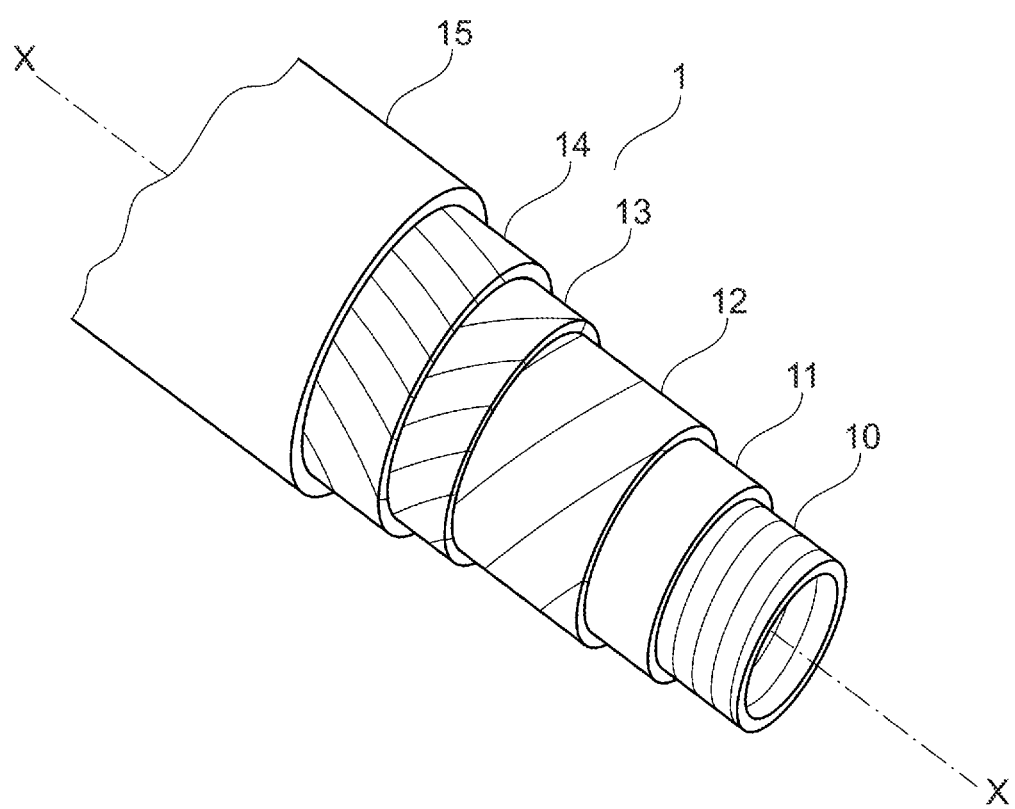
FIG. 1 shows a flexible pipe.

FIG. 1 shows a flexible pipe 1 according to the invention having a longitudinal axis x-x which is also the carcass axis. From the inside to the outer side, the flexible pipe comprises a carcass 10 manufactured according to an embodiment of the method of the present invention. The carcass supports an internal pressure sheath 11 made from polymer material extruded onto the carcass 10. The internal pressure sheath 11 is reinforced with a pressure armor layer 12 and two tensile armor layers 13, 14. The two tensile armor layers 13 and 14 are cross-wound in respect of the axis x-x. The outer surface of the flexible pipe 1 is constituted by a protective outer sheath 15.

Figure 2:
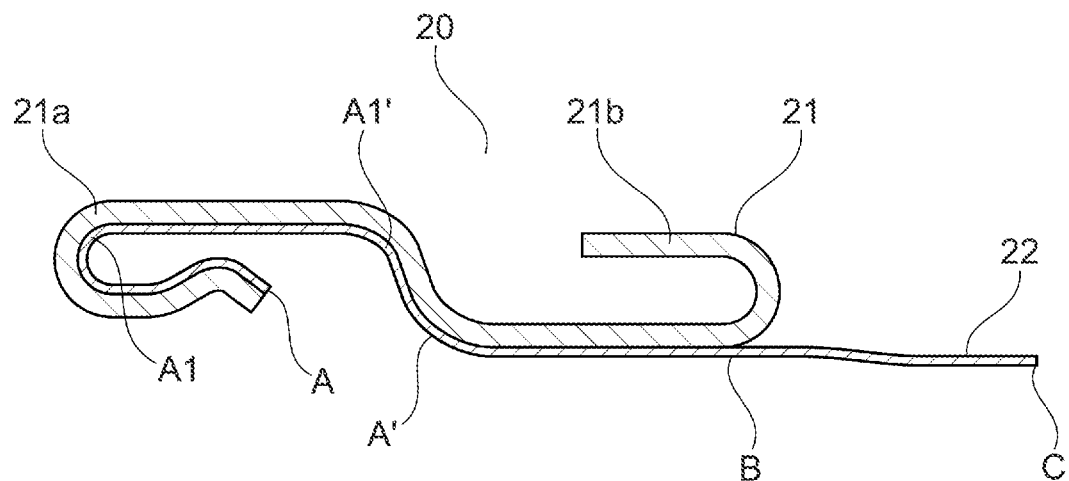
FIG. 2 shows a profile comprising a first metallic strip and a cover metallic strip.

FIG. 2 illustrates a cross-sectional view of an assembled profile 20 which when helically wound and interlocked forms the carcass produced according to the invention. The assembled profile 20 comprises the profile of the first metallic strip 21 with a first fold 21a and a second fold 21b and the profile of the cover metallic strip 22. The width of the cover metallic strip 22 extending from A to A' is the anchor width section of the cover strip, which is inserted into the first fold 21a of the first metallic strip 21 for anchoring the cover strip.

The width of the cover metallic strip 22 extending from B to C is the cover width section of the cover strip intended to cover a gap between adjacent windings of the first metallic strip 21. The cover width section extends beyond the second fold 21b.

The width extending from A to A' of the cover metallic strip 22 preferably includes at least 20%, such as at least 40% of the total width extending from A to C of the cover metallic strip. At least a part of the anchor width section A-A' of said cover strip has been subjected to the weakening treatment of resistance against length extension before insertion into the first fold 21a. Preferably, at least the width portion A1-A1', which when helically wound will be wound with largest radius and therefore advantageously is subjected to the pretreatment. The pretreatment advantageously also provides a reduction in resistance to bending as described above.

Figure 3:
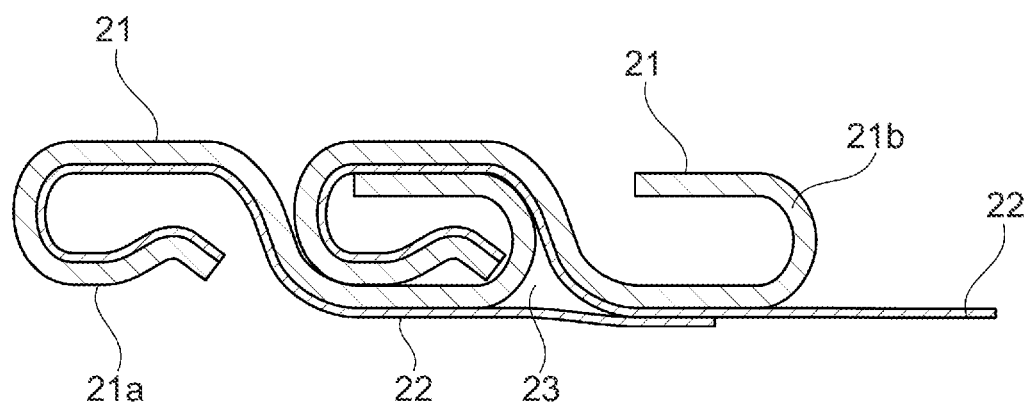
FIG. 3 illustrates a carcass structure.

FIG. 3 is a schematic cross sectional view of the profile assembly illustrated with two interlocked windings and it can be seen that the first fold 21a of the first metallic strip 21 is interlocked with the second fold 21b of the first metallic strip 21 in an adjacent winding and at the same time the anchor width section is anchored in the interlocking and the cover width section covers the gap 23 between the adjacent windings of the profile of the first metallic strip 21.

Figure 4:
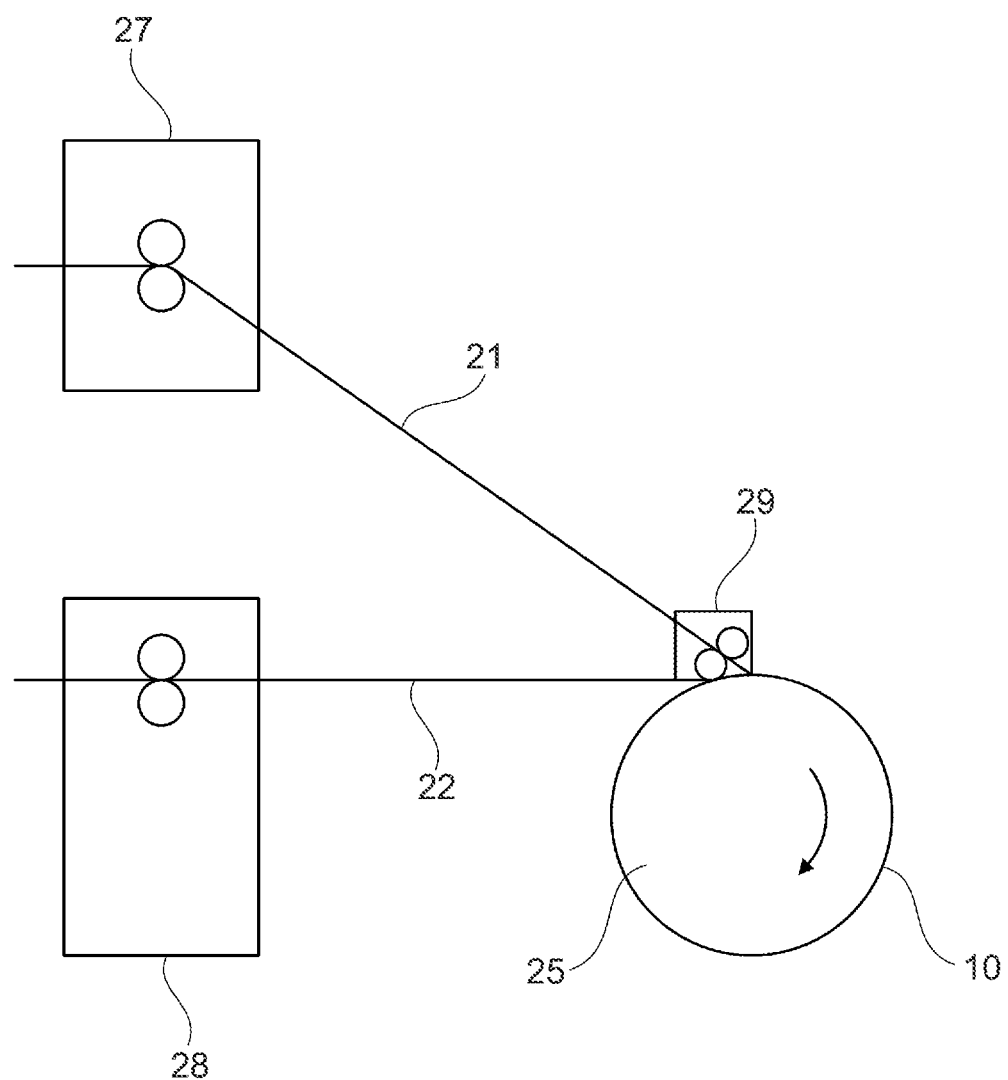
FIG. 4 is a schematic illustration of a method of an embodiment of the invention of manufacturing of a carcass.

FIG. 4 shows an embodiment of the method of the manufacture of a carcass 10 according to the invention. The carcass 10 is rolled up on the mandrel 25 which is rotating during the formation of the carcass 10. The first metallic strip 21 is pre-shaped in station 27 and the cover metallic strip 22 is pre-shaped in station 28. The pre-shaped strips 21 and 22 are guided to the assembling station 29 where they are assembled and subjected to a final folding process to achieve their final profile shape in the carcass 10. In the embodiment illustrated in FIG. 4, the assembling station 29 is located adjacent to the mandrel. In a modified embodiment the assembling station 29 may be located with a distance to the mandrel or the assembling station 29 may extend over a length section starting from a distance to the mandrel and to the first metallic strip 21 and cover strip 22 has been at least partly wound e.g. as illustrated in FIG. 4a. In the final profile shape a part of the cover metallic 22 strips is locked inside and engaging and conforming to a part of the profile of the first metallic strip 22. The pretreatment of at least a part of the anchor width section may be performed in the station 28 or it may advantageously be performed in a not shown previous pretreatment station.

As shown in FIG. 4, the cover strip 22 is supplied to the assembling station with an angle which is tangential to the outer surface of the mandrel to which the first metallic strip 21 and the cover metallic strip 22 is rolled up. Thereby a pulling force F may be applied in the cover strip 22 e.g. by the station 28. During application of the cover strip 22, a pulling force F is applied to the cover strip 22. The pulling force F, ensures a stretching of at least a portion of the anchor width section of the cover strip to ensure that the portion of the cover strip adjacent to the anchor width section of the strip may be applied without undesired tension undulations to provide a desired smooth bore wall in the pipe.

Since the anchor width section has been subjected to the pretreatment comprising a weakening treatment of resistance against length extension and/or a length extension of the pretreated part of the anchor width section, the application of the pulling force F primarily results in a stretching of the pretreated portion. Since at least a part of the anchor width section are wound with a larger diameter than the cover width section, this pulling force ensures that the portion of the cover metallic strip located between the anchor width section and the cover width section may be practically free of tension undulations, which result in that the bore may be formed to have a smooth bore wall.

In the variation of FIG. 4 of manufacturing of a carcass as illustrated in FIG. 4a, the cover strip 22 and the first metallic strip 21 are supplied to the assembling station 29a. The assembling station 29a comprises a pre-assembling roller B, which pushes the anchor width section of the cover strip 22 into the first fold of the first metallic strip 21. The first metallic strip 21, has been pre-shaped in a not shown pre-shaping station e.g. as illustrated in FIG. 4, ref 28. After or simultaneously with the pre-shaping, the first metallic strip 21 may be subjected to a bending by one or more bending rollers as illustrated with the bending roller A1 and the final bending roller A2. Due to the final bending roller A2 the first metallic strip 21 is pressed towards the cover strip 22 when it reaches the assembling station 29a, providing that the anchor width section of the cover strip 22 into the first fold of the first metallic strip 21 by the pressure provided by the pre assembling roller B. The stiffness of the first metallic strip 21 may additionally provide that the bending down by the bending roller(s) A1 results in forcing the first metallic strip 21 towards the cover strip 22 when it reaches the assembling station 29a.

The cover strip 22 has preferably also been subjected to a pre-shaping in a not shown pre-shaping station e.g. as illustrated in FIG. 4, ref 27. As shown the angle of the cover strips 22 towards the mandrel 25 is substantially tangential to the outer surface of the mandrel to which the first metallic strip 21 and the cover metallic strip 22 is rolled up to form the carcass 10. A pulling force F is applied in the cover strip 22.

The pulling force F, ensures a stretching of at least a portion of the anchor width section of the cover strip 22 to ensure that the portion of the cover strip adjacent to the anchor width section of the strip may be applied without undesired tension undulations to provide a desired smooth bore wall in the pipe.

As illustrated in FIG. 4a, the assembling of the first metallic strip 21 and the cover metallic strip 22 is initiated at the assembling roller B, which is located at a distance from the mandrel 25 and a first winding roller C1. The distance between the assembling roller B and the first winding roller C1 may advantageously be at least 10% of the radius of the mandrel, such as from the radius of the mandrel to twice the diameter of the mandrel.

In the illustrated embodiment two winding rollers C1, C2 are shown. In variations thereof there is only the first winding roller C1. In another variation thereof, several further winding rollers, such as 1, 2, 3, 4 or even 5 additional winding rollers may be located along the periphery of the mandrel 15

The assembling is continued as the first metallic strip 21 and the cover metallic strip 22 passes the winding rollers C1, C2 until at some point the assembling is completed. In practice the assembling may be fully completed once the first metallic strip 21 has been interlocked with the subsequent winding thereof.

The winging direction is illustrated with the arrow,

In a further variation thereof the, the entire application system, including the bending roller(s) A, the assembling roller B, the one or more winding rollers C1, C2 and preferably the pre-shaping stations, are rotating around the mandrel 25, which is at stand still or is rotating with a rotating rate which is 10% or less relative to the rotating rate of the entire application system and preferably in the opposite direction.

Figure 5:
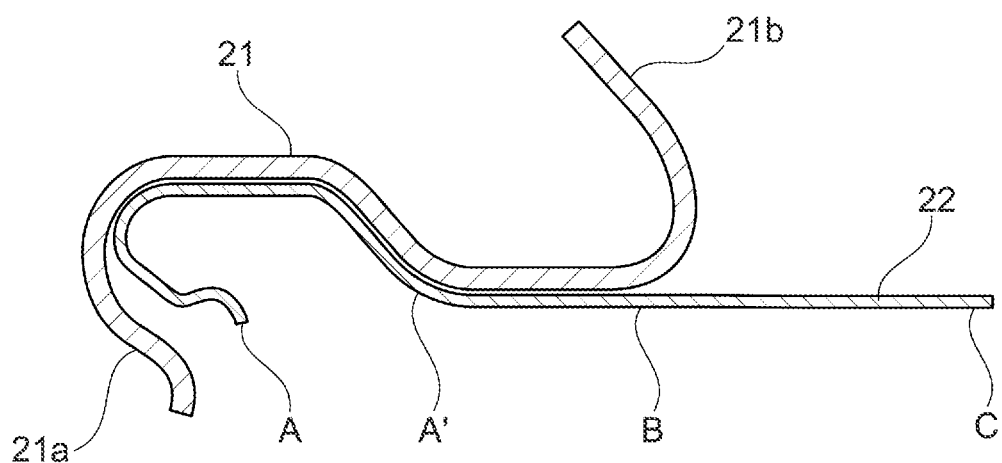
FIG. 5 shows details of a carcass formation process.
Figure 6:
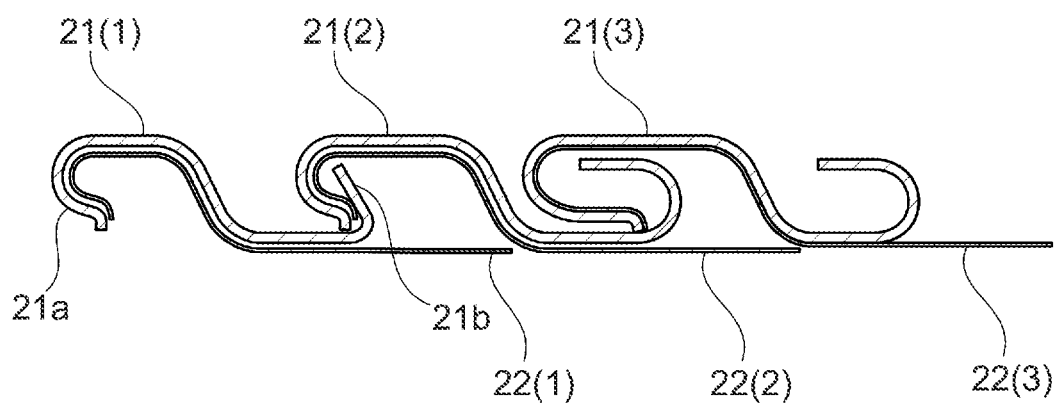
FIG. 6 shows further details of a carcass formation process.

The final steps of the carcass forming process are shown schematically in further details in FIGS. 5 and 6.

In FIG. 5 the first metallic strip 21 is shown with folds 21a and 21b which is not fully formed, but is sufficiently open to allow insertion of the cover metallic strip 22 such that the anchor width section of the cover metallic strip extending from A to A', can be inserted into the first fold 21b of the first metallic strip 21. The anchor width section, which has been subjected to the pretreatment, includes at least 20% of the width of the cover metallic strip (extending from A to C).

By application of a pulling force in the cover strip 22 the pretreated anchor width section is subjected to strain and is thereby stretched as explained above. The portion of the cover metallic strip located between the anchor width section and the cover width section (i.e. A' to B) may thereby be wound without tension undulations, When the folds 21a and 21b are interlocked and folded to their final positions the anchor width section will be fully anchored in the interlocking.

This process is illustrated in FIG. 6 showing three adjacent windings of the first metallic strip 21(1), 21(2) and 21(3) and the corresponding three adjacent windings of the cover metallic strips 22(1), 22(2) and 22(3).

The profiles in the first winding of the first metallic strip 21(1) and the cover strip 22(1) have not yet been folded to their finale shape and the first fold 21a and the second fold 21b of the first metallic strip 21(1) in this winding are partly open to allow insertion of the anchor width section of the cover metallic strip 22(1). In the second winding of the strips 21(2) and 22(2) the folding process is not completed. In the third winding of the metallic strips 21(3) and 22(3), the profiles have been folded to their final shape and the interlocking between the first and seconds folds and the anchoring of the anchor width section are complete.

Figure 7:
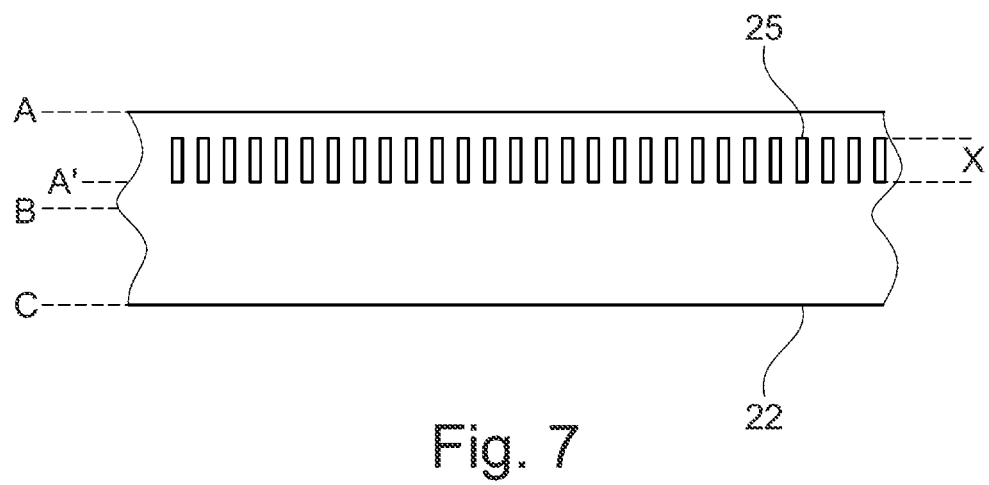
FIG. 7 shows an embodiment of a cover metallic strip.

FIG. 7 shows an embodiment of the cover metallic strip 22 which have been subjected to the pretreatment described above, where a part x of the width A-C have been treated by cutting such that adjacent through holes 25 have been formed along the length of the strip 22. The through holes 25 reduce the resistance against length extension resistance to bending in the anchor width section A-A' of the strip 22 when compared with the cover width section B-C of the strip.

Figure 8:
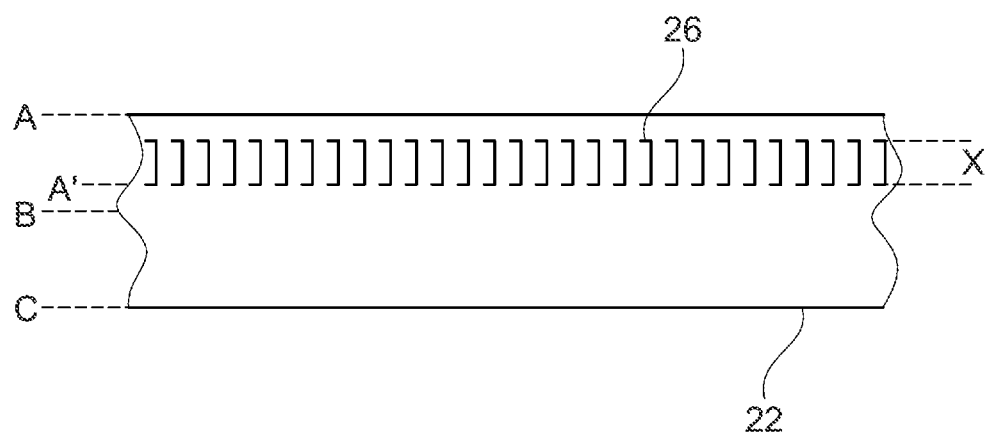
FIG. 8 shows an embodiment of a cover metallic strip.

FIG. 8 shows a corresponding embodiment in which the cover metallic strip 22 have been subjected to a treatment in the part x of the width A-C of the metallic strip. The treatment has been performed by cutting, such that adjacent "C" shaped 26 grooves have been formed along the length of the cover strip 22. These grooves 26 reduce the resistance against length extension resistance to bending in the anchor width section A-A' of the strip 22 when compared with the cover width section B-C of the strip.

Figure 9:
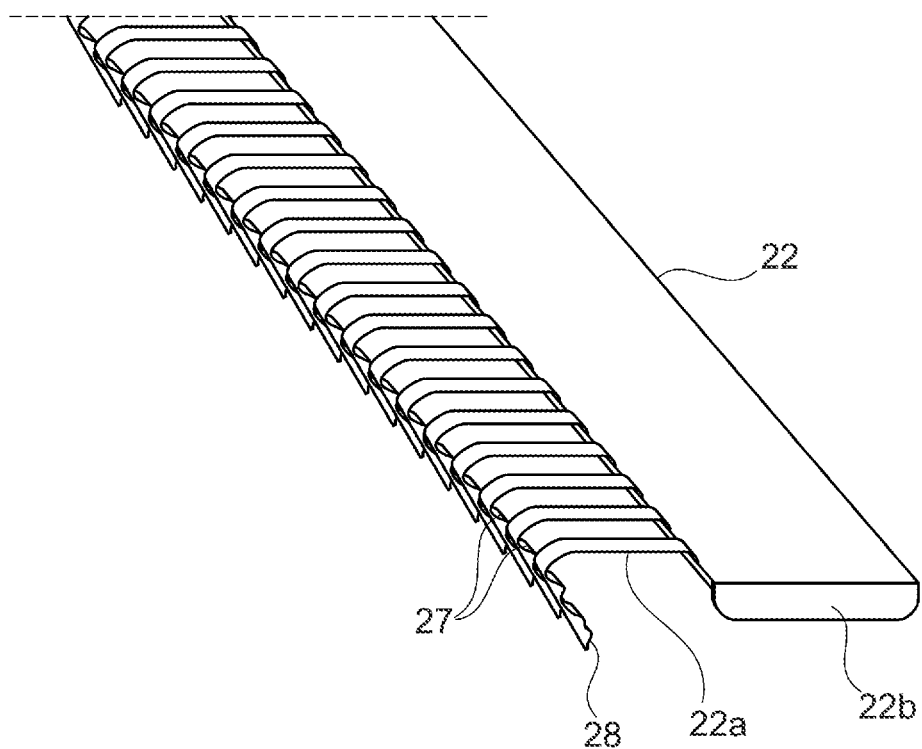
FIG. 9 shows an embodiment of a cover metallic strip.

FIG. 9 is a perspective view of a pretreated and preshaped cover strip 22. The cover strip 22 comprises an anchor width section 22a and a cover width section 22b. The anchor width section has been pretreated by weakening lines in form of strips shaped holes 27 cut out of the material. The weakening lines are perpendicular to the length direction of the cover strip. An edge part of the anchor width section is free of weakening lines to keep the strip stable during preshaping.

Figure 10:
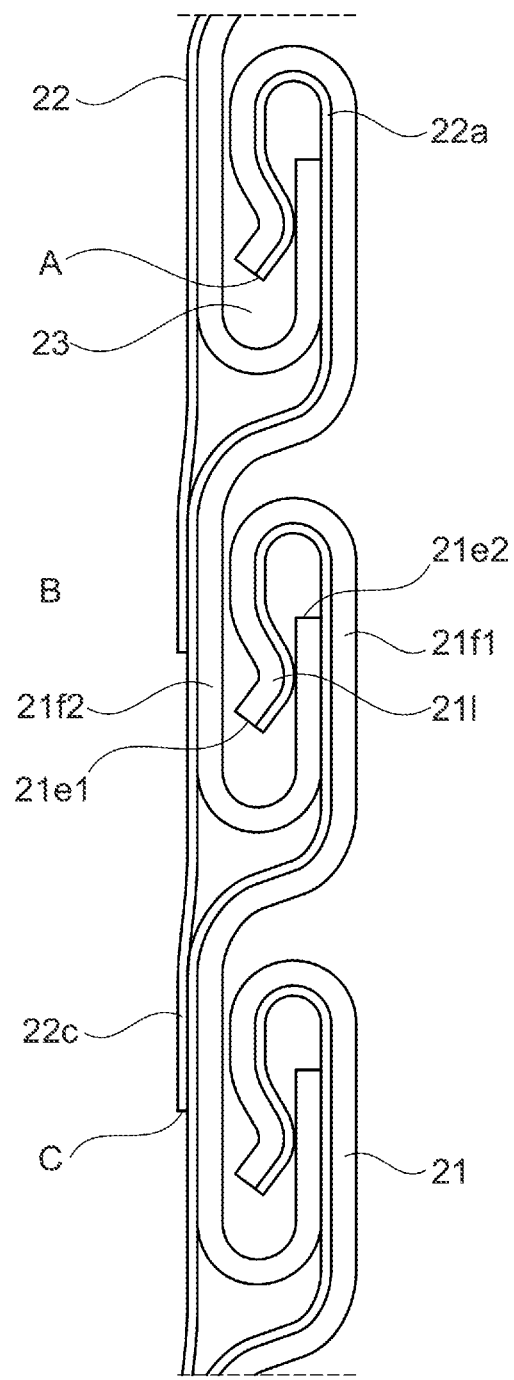
FIG. 10 is a schematic cross-sectional view of a carcass produced according to an embodiment of the invention.

FIG. 10 is a schematic cross-sectional view of a carcass produced according to an embodiment of the invention.

The carcass may advantageously form part of a pipe, wherein the cover width section faces towards the bore B. The carcass comprises a first metallic strip 21 and a cover strip 22. The first metallic strip is shaped to have a first fold 22f1 and a second fold 22f2, which are engaged as described above. The first metallic strip has a first edge 21e1 forming part of the first fold and a second edge 21e2 forming part of the second fold. The first metallic strip is shaped to have a lip 21l adjacent to the first edge 21e1.

The cover strip 22 comprises an anchor width section 22a and a cover width section 22c and comprises an anchor width section edge A and a cover width section edge C. The anchor width section 22a of the cover strip 22 is located in the first fold and extends beyond the lip 21l of the first metallic strip 21. Thereby a width part of the anchor width section is located between the lip 21l and a part of the second fold 21f2 of the first strip.

The cover width section 22c covers a gap 23 between adjacent windings of the first metallic strip 21. In the shown embodiment the cover width section of the cover strip is substantially plane. In a variation thereof the cover width section 22c may be folded slightly into the gap 23 e.g. to form a trench, such as into a depth corresponding to the thickness of the first strip. This slightly depression also referred to as a trench may have the function of terminating that may have been formed. In addition the trench makes it easier to wind the first metallic strip and the cover metallic strip with a relatively large pitch than without the trench.

What is claimed is:

1. A method of producing a carcass for a flexible pipe, the method comprising:
   providing at least one first metallic strip and shaping said first strip to have a profile with a first fold adapted to face towards said carcass axis and a second fold adapted to face away from said carcass axis,
   providing a cover metallic strip with a length and a width,
   inserting an anchor width section of said cover strip into said first fold,
   providing that a cover width section of said cover strip extends beyond said second fold, and
   helically winding said first metallic strip and said cover strip, to provide that said first fold engages and interlocks with said second fold and that said cover width section covers a helical interstice between windings of the first metallic strip on the inner side of the carcass,
   wherein at least a part of said anchor width section of said cover strip is subjected to a pretreatment before insertion into said first fold, and
   wherein said pretreatment comprising a weakening treatment of resistance against length extension and/or a length extension of the pretreated part of the anchor width section.

2. The method of claim 1, wherein the first fold of the first strip has a depth and a width at said depth, and wherein said pretreated part of said anchor width section comprises at least a width corresponding to said width at said depth of the first fold.

3. The method of claim 1, wherein the first fold of the first strip has a depth and curved section between respectively a first edge and a second edge along said depth, and wherein said pretreated part of said anchor width section comprises at least a width corresponding to said width at said depth of the first fold and one or both of said curved sections.

4. The method of claim 1, wherein said pretreatment comprises stretching the material to increase in length, preferably by preforming at least a part of the anchor width section to conform to said first fold.

5. The method of claim 1, wherein said pretreatment comprises providing weakening lines, said weakening lines are substantially perpendicular to the length of the cover strip.

6. The method of claim 5, wherein said weakening lines are provided by cutting, wherein the cutting comprises cutting fully through the strip material, or
   cutting out strips of the treated part of the anchor width section.

7. The method of claim 5, wherein at least a part of said weakening lines are not fully penetrating the strip material.

8. The method of claim 1, wherein the first metallic strip is thicker than the cover strip.

9. The method of claim 1, wherein the method comprises providing that the major part of the anchor width section of said cover strip is conforming with an inner surface of said first fold and held in fixed position by the second fold of the first metallic strip in a consecutive winding.

10. The method of claim 1, wherein said first metallic strip has a first edge forming part of said first fold and a second edge forming part of said second fold, wherein the method comprises forming said first metallic strip to have a lip adjacent to said first edge, wherein said anchor width section of said cover strip located in the first fold extends beyond said lip, to be located between said lip and said second fold which is interlocked with said first fold.

11. The method of claim 1, wherein said first metallic strip has a first edge forming part of said first fold and a second edge forming part of said second fold, wherein said anchor width section of said cover strip located in the first fold extends to the first edge said first metallic strip.

12. The method of claim 1, wherein said method comprises applying a pulling force F to said cover strip during the insertion of the anchor width section of said cover strip into said first fold and/or during the helically winding of said first metallic strip and said cover strip, wherein the pulling force is sufficient to stretching at least a portion of the anchor width section.

13. The method of claim 1, wherein said pretreatment comprises providing weakening lines in at least a part of said anchor width section of said cover strip by partly or fully cutting through the strip material and wherein the method comprises subjecting at least a portion of said anchor width section to tensile strain during the insertion of the anchor width section of said cover strip into said first fold and/or during the helically winding of said first metallic strip and said cover strip, wherein said tensile strain is sufficient to provide a deformation of a plurality of said weakening lines, wherein said deformation of each of said plurality of weakening lines comprises providing that a pair of a first and a second opposite edges of a weakening line separates and/or increases distance to each other.

14. The method of claim 13, wherein said cover strip has a first edge forming an edge of said cover width section and a second edge forming an edge of said anchor width section and wherein said weakening lines individually from each other are perpendicular or up to 10 degrees from being perpendicular to the anchor width section edge and wherein said weakening lines comprises parallel straight lines.

15. The method of claim 1, further comprising, producing the flexible pipe:
    extruding a polymer layer onto the carcass;
    applying one or more armor layers around the polymer layer; and
    optionally applying one or more polymer layers.

16. A flexible pipe for conveying a fluid, said pipe comprising a center axis along the length of the pipe and from the inside and out;
    a carcass,
    an internal pressure sheath and
    at least one armor layer,
    said carcass comprises at least one first metallic strip and a cover strip, said first metallic strip comprises a first fold facing towards said center axis and a second fold facing away from said center axis, said cover strip comprises an anchor width section and a cover width section, and wherein said first and said second fold of said first strip being interlocked with said anchor width section anchored in said interlocking and wherein said anchor width section comprises weakening lines in at least a part of said anchor width section of said cover strip, wherein said weakening lines are fully penetrating the material of said anchor width section.

17. The flexible pipe of claim 16, wherein said weakening lines comprises cuts into said cover strip material.

18. The flexible pipe of claim 16, wherein each of a plurality of said weakening lines comprises a pair of a first and a second opposite edges which are at least partly separated from each other to provide a through going opening in the strip material.

19. The flexible pipe of claim 16, wherein said first metallic strip has a first edge forming part of said first fold and a second edge forming part of said second fold, wherein said metallic strip is shaped to have a lip adjacent to said first edge, wherein said anchor width section of said cover strip located in the first fold extends beyond said lip, to provide that a portion of the anchor width section is located between said lip and said second fold which is interlocked with said first fold.

20. A method of producing a carcass for a flexible pipe, the method comprising:
    providing at least one first metallic strip and shaping said first strip to have a profile with a first fold adapted to face towards said carcass axis and a second fold adapted to face away from said carcass axis,
    providing a cover metallic strip with a length and a width,
    inserting an anchor width section of said cover strip into said first fold,
    providing that a cover width section of said cover strip extends beyond said second fold and
    helically winding said first metallic strip and said cover strip, to provide that said first fold engages and interlocks with said second fold and that said cover width section covers a helical interstice between windings of the first metallic strip on the inner side of the carcass,
    wherein at least a part of said anchor width section of said cover strip is subjected to a pretreatment before insertion into said first fold,
    wherein said pretreatment comprising a weakening treatment of resistance against length extension and/or a length extension of the pretreated part of the anchor width section, and
    wherein the part of said anchor width section subjected to the pretreatment comprises a width section which during helically winding of the at least one first metallic strip and said cover strip is subjected to tensile strain.

21. A method of producing a carcass for a flexible pipe, the method comprising:
    providing at least one first metallic strip and shaping said first strip to have a profile with a first fold adapted to face towards said carcass axis and a second fold adapted to face away from said carcass axis,
    providing a cover metallic strip with a length and a width,
    inserting an anchor width section of said cover strip into said first fold,
    providing that a cover width section of said cover strip extends beyond said second fold, and
    helically winding said first metallic strip and said cover strip, to provide that said first fold engages and interlocks with said second fold and that said cover width section covers a helical interstice between windings of the first metallic strip on the inner side of the carcass,
    wherein at least a part of said anchor width section of said cover strip is subjected to a mechanical pretreatment before insertion into said first fold,
    wherein said pretreatment comprising a weakening treatment of resistance against length extension and/or a length extension of the pretreated part of the anchor width section.

* * * * *